United States Patent
Wallner et al.

(10) Patent No.: US 10,078,488 B2
(45) Date of Patent: Sep. 18, 2018

(54) STRUCTURES AND METHODS FOR CONTROLLING THE PLAYBACK OF MUSIC TRACK FILES

(71) Applicant: 100 Milligram Holding AB, Sollentuna (SE)

(72) Inventors: Daniel Wallner, Sollentuna (SE); Jonas Norberg, Stockholm (SE)

(73) Assignee: 100 Milligrams Holding AB, Sollentuna (SE)

( * ) Notice: Subject to any disclaimer, the term of this patent is extended or adjusted under 35 U.S.C. 154(b) by 162 days.

(21) Appl. No.: 15/013,732

(22) Filed: Feb. 2, 2016

(65) Prior Publication Data

US 2016/0224310 A1   Aug. 4, 2016

(30) Foreign Application Priority Data

Feb. 3, 2015   (SE) ...................................... 1530010

(51) Int. Cl.
```
G06F 17/00      (2006.01)
G06F 3/16       (2006.01)
G11B 27/034     (2006.01)
G11B 27/10      (2006.01)
G10H 1/00       (2006.01)
```

(52) U.S. Cl.
CPC ............ *G06F 3/165* (2013.01); *G11B 27/034* (2013.01); *G11B 27/105* (2013.01); *G10H 1/0025* (2013.01); *G10H 2210/125* (2013.01); *G10H 2210/145* (2013.01); *G10H 2210/385* (2013.01); *G10H 2240/131* (2013.01); *G10H 2250/035* (2013.01)

(58) Field of Classification Search
CPC ........... G10H 1/0025; G10H 2210/125; G10H 2210/131; G10H 2210/145; G10H 2210/155; G10H 2210/385; G10H 2240/131; G10H 2250/035; G10H 7/008
See application file for complete search history.

(56) References Cited

U.S. PATENT DOCUMENTS

2011/0231426 A1* 9/2011 Fejta .................... G11B 27/038
                                                           707/769
2011/0239078 A1* 9/2011 Luby ................ H04N 21/23106
                                                           714/752

* cited by examiner

*Primary Examiner* — Thomas Maung
(74) *Attorney, Agent, or Firm* — Rothwell, Figg, Ernst & Manbeck, P.C.

(57) ABSTRACT

A mix instructions file for controlling the playback of at least one music track file, the mix instructions file comprising one or more instructions including an indication of the at least one music track file at the point in time when the at least one music track file is to be accessed, and at least one effect for manipulating the playback of the at least one music track file. The indication of the at least one music track file and the at least one function comprise the state of the music mix at the point in time. The mix instructions file comprising at least a first and a second packet, that may be transmitted independently of each other, the second packet holding information about the playback state of the mix at the corresponding end of the first packet.

23 Claims, 2 Drawing Sheets

STRUCTURES AND METHODS FOR CONTROLLING THE PLAYBACK OF MUSIC TRACK FILES

CROSS-REFERENCE TO RELATED APPLICATIONS

The present application claims priority benefit under 35 U.S.C. § 119(a) of Swedish Application No. 1530010-6, entitled "A Mix Instructions File, a Computer Program Product and a Computer Device," filed Feb. 3, 2015, the contents of which are incorporated herein by reference in their entirety.

TECHNICAL FIELD

The present invention relates to a mix instructions file and data structure for controlling a music mix and for controlling playback of a music mix, to a computer-implemented method for creating and executing a mix instructions file and to a computer device comprising at least one such a computer program product.

BACKGROUND

The present invention relates to the creation and playback of music mixes. It is known to create and store music mixes in which music track files are manipulated into a music mix that can be replayed, or played back. Such music track files tend to become rather large, since they include both the mix instructions and the music files themselves.

International Patent Application No. WO 2008/004971 discloses a method of creating a music mix in which the instructions for how to mix the music files are stored in a separate mix instructions file, which is arranged to identify the music track files as they are needed in the mix. The mix instructions file has indications of the music tracks in the music files.

In the above-mentioned '4971 application, the music track files can be retrieved from various databases, for example over the Internet. A mix instructions file is stored locally, and is often also created locally. In the '4971 application, the mix instructions file itself is not disclosed to be retrievable from another computer. Such a remote mix instructions file retrieval would lead to problems because the retrieval of a file takes some time, depending on the size of the file and the capacity of the network. However, at the same time a mix instructions file is being retrieved, it would be desirable to be able to share the mix instructions on the file, even in real time, that is, while the set of mix instructions is being created on the file.

It is an object of the present invention to provide a mix instructions file and data structure for producing a mix of a plurality of music tracks, the file and structure being suitable for file streaming over a network.

SUMMARY

The invention relates to a mix instructions file for playback of a mix of music tracks and to a first computer-implemented method and a second computer-implemented method for creating such a mix instructions file and playing such a mix of music tracks based on the mix instructions file, respectively.

In particular, the invention relates to a mix instructions file for controlling the playback of at least one music track file, said mix instructions file comprising instructions, or data, including an indication of the at least one music track file at the point in time when the at least one music track file is to be accessed and played, and at least one effect for manipulating the play of the at least one music track file. The sum of the indication of the at least one music track file and the at least one effect constitutes the state of the music mix. The mix instructions file is divided into at least a first and a second packet, at least the second packet comprising, at its beginning, information about the playback state of the music mix at the point in time corresponding to the beginning of the second packet.

The structure and content of the mix instructions file facilitates the transmission of the mix instructions file between computers, in particular from a first computer on which it is being generated to a second computer where the mix instructions file controls the play of the music. The music playback can even happen in near real time as the mix instructions file is being created, since packets of the mix instructions file that have already been created may be transmitted while the rest of the mix instructions file is being created. Each packet can be packed in a frame, which enables the packet to be synchronized for streaming.

In one embodiment the mix instructions file further comprises an advance pointer to the at least one music track file at an point in time before the music track file is to be accessed, to enable timely retrieval of the music track file. This is because the retrieval of a music track file normally takes some time, the amount of time depending on where it is stored. The advance pointer is set to be sufficiently early to ensure that the music track file can be retrieved before it is to be played in the music mix.

Each mix instructions packet can have, at its beginning, complete information of the state of the music mix at the relevant point in time corresponding to the start of the packet. This ensures that each new packet has the information needed to continue the playback without any interruption or sudden changes when a new packet is started.

One embodiment is directed to a non-transitory computer readable medium comprising a mix instructions data structure for controlling the playback of at least one music track file, the mix instruction data structure including a mix instructions file including one or more instructions, each instruction including an indication of at least one music track file at a point in time when the at least one music track file is to be accessed for playback; and an indication of least one effect for manipulating the playback of the at least one music track file, wherein the indication of the at least one music track file and the at least one effect constitutes the state of the music mix at the point in time; and wherein the mix instructions file further comprising at least a first packet and a second packet, each first and second packet comprising an instruction, each first and second packet capable of being transmitted independently of each other, and the second packet being arranged to be transmitted after transmission of the first packet and including information defining the state of the mix at the end of the first packet.

A further embodiment includes the first packet and second packet being configured and transmitted to provide for near real-time playback of the music tracks as the mix instructions file is being created and transmitted.

Yet another embodiment includes a non-transitory computer readable medium encoded with computer executable instructions which, when run on a first computer device, will cause the first computer device to (a) retrieve information identifying the location of at least one music track to be included in a music mix at a point in time and add the location information to a mix instructions file; (b) select at least one effect to control the playback of the at least one music track and add an effect indicator to the mix instructions file as related to the music track location information; repeat steps (a) and (b) until the mix instructions file for the entire music mix has been created; and transmit the mix instructions file to a second computer to be processed by a playback program, causing the second computer device, with or without user input, to play the music mix in accordance with the information and indicators in the mix instructions file; wherein the location information and the effect indicator for the at least one music track constitute the state of the music mix at the point in time; wherein the mix instructions file is divided into at least a first packet and a second packet, with the second packet following the first packet in the transmission of the mix instructions file; and wherein information defining the state of the music mix at the end of the first packet is inserted at the start of the second packet.

A further embodiment provides for a computer-implemented method for playback of music, including (a) reading, on a second computer, a mix instructions file that has been created on and transmitted over a network by a first computer; (b) retrieving a music track based on information in the mix instructions file; (c) initiating playback of the music track at a point in time on the music track based on the information in the mix instructions file for that music track; and (d) applying an effect to the music track to control playback of the music track based on information in the mix instructions file for that music track.

The methods, files, and structures disclosed herein enables a mix instructions file that is being created remotely to be transmitted to a second, different location and control the playback of music files at the second location while the mix instructions file is in the process of being created, since a packet of the mix instructions file that has already been created can be retrieved and read while a new mix instructions file packet is being created. The mix instructions file can be read and can control the play of the music file with minimal delay, that is, only the network latency and very little additional delay.

The invention also relates to a computer-readable memory comprising computer-readable instructions for use in a computer device, said instructions being arranged to cause the computer device to retrieve a mix instructions file and perform the instructions in the mix instructions file. Thereby, the computer device can be used to play a mix of music tracks wherein the music tracks are mixed and manipulated using disc jockey ("DJ") functions. The instructions include instructions to retrieve at least one music track file to be played and instructions affecting the playback of the music track file or files.

The mix instructions file and the music track files may be stored locally on the computer device, or may be retrieved from one or more other computer devices, for example through the Internet or other network. In this context a computer device could be any type of computer capable of storing files, including servers, personal computers, smartphones, etc. For example, the program can be arranged to determine which files are available locally and retrieve any files that are not available locally over a network. The invention is suitable for use with music streaming services, such as Spotify® and WiMP®.

The mix could include any number of music tracks, two, three or more. In fact, since the mix typically also comprises manipulation within one single music track, the mix could include only one track.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
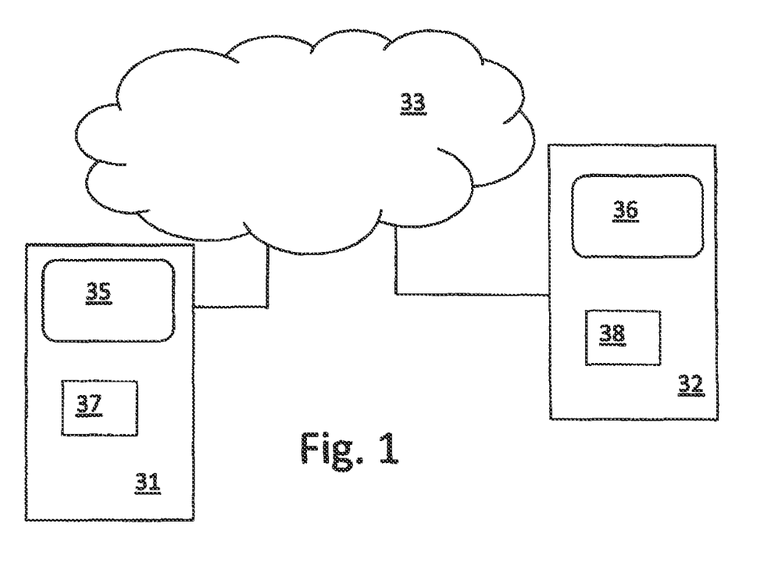
FIG. 1 shows a network environment in which the embodiments may be used.

FIG. 1 discloses a network environment in which the invention may be used. A first and a second computer device 31, 32 are schematically shown connected to a network, such as the Internet, represented by a cloud 33. The computer devices are shown in FIG. 1 as small handheld devices but may be any type of computer device operable by a user, including devices such as mobile telephones and tablets having the ability to play music. The computer devices 31, 32 have user input/output means and typically but not necessarily comprise screens 35, 36 which may include some or all of the user input/output means as is common in the art. As is also common in the art, the computer device is connectable to the network 33 through a wired or wireless connection. Typically a computer device today has means for connecting to a network and/or to other devices through a number of different types of connections, including wired Ethernet, WiFi, Bluetooth and others.

Computer readable program code may be stored in the computers 31, 32 in a transitory or non-transitory computer readable medium encoded with computer-executable instructions, such as, but not limited, to magnetic media (e.g., a hard disk), non-transitory memory, optical media (e.g., a DVD), memory devices (e.g., random access memory), and the like. In some embodiments, computer readable program code is configured such that, when executed by a processor (not shown), the code, or instructions, causes exemplary computers 31, 32 to perform steps described herein for the selecting, retrieval, mixing, and playback of music tracks and files, along with the creation, transmission, storage, and processing of mix instructions files and mix instructions data structures. In other embodiments, the exemplary computers 31, 32 are configured to perform the described steps without the need for code. Computer readable data and data structures can similarly be stored in a transitory or non-transitory computer readable medium within or accessible by the computers 31, 32. Therefore, the features of the present embodiments described herein may be implemented in any suitable combination of hardware and/or software.

Other computer devices (not shown) can also be connected to the network 33. These computer devices may be servers, personal computers, tablets or any other type of computer devices storing data and files, or being able to transmit data and files. From these computer devices, the first and the second computer devices 31, 32 can retrieve music track files and/or mix instructions files, which can be downloaded or streamed. In the first case the files are retrieved through the network and stored on the computer device 31 or 32 before they are used. In the latter case, the files are retrieved and buffered on the computer device 31 or 32 while they are being used; but are typically not stored persistently on the respective computer device 31, 32, although this is also possible.

Figure 2:
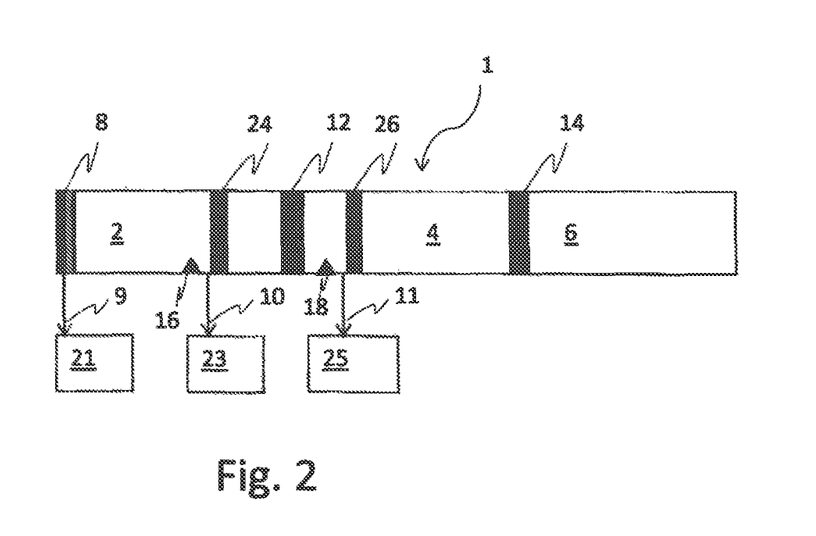
FIG. 2 shows a first example of a mix instructions file divided into packets and arranged to work on a number of music track files.
Figure 3:
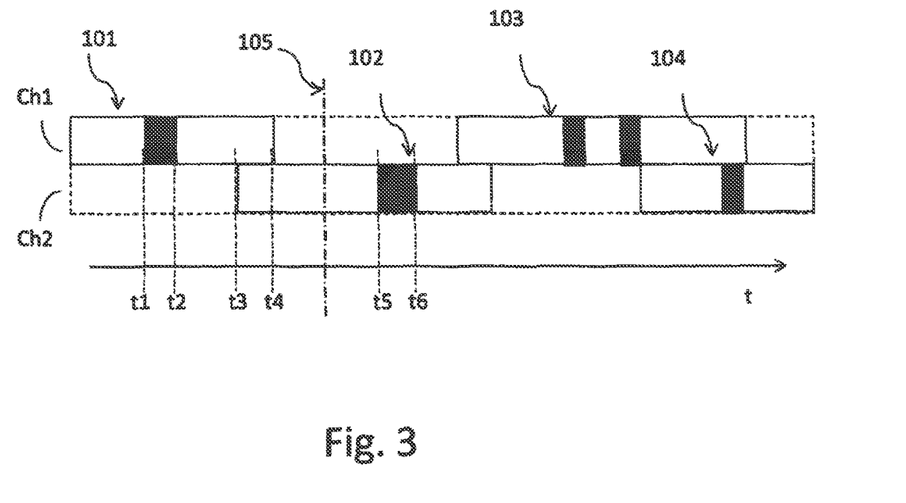
FIG. 3 shows schematically the playback of music tracks using a mix instructions file to control the playback according to one embodiment.
Figure 4:
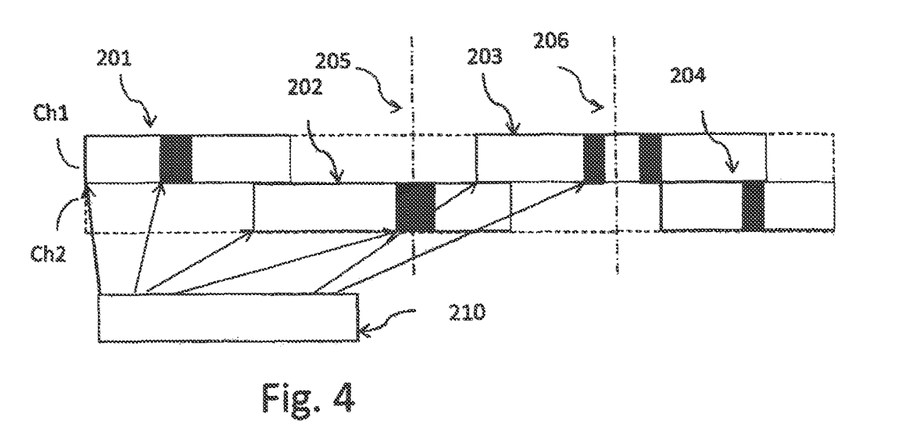
FIG. 4 shows an alternative embodiment for the playback of music tracks.

In this example, the first computer device 31 is the device on which a mix instructions file is generated. Therefore, this computer device 31 has a mix generating program 37 which will allow the user of the device 31 to generate a music mix by loading and playing back tracks, manipulating their speed and adding other effects, and mixing between tracks in manners known in the art. The mix generating program 37 also comprises some functions for storing the mix in a mix instructions file and for transmitting it to other devices such as the second computer device 32. This can happen while the mix or the mix instructions file is being generated or at a later stage. The mix instructions file is created in computer readable medium as a data structure for subsequent processing for the desired playback of music. Exemplary formats of the data structure are shown in FIGS. 2-4. The features of the mix generating program 37 for facilitating the creation and distribution of the mix instructions file will be discussed below.

For processing of the mix instructions file and playback of the music mix, the second computer device 32 has a playback program 38, which may be a small program such as a script or an app, which is arranged to retrieve the mix instructions file, retrieve the music track files and execute the instructions and effects indicated in the mix instructions file at the appropriate points in time as required. The whole mix instructions file may be retrieved at once, but preferably it is divided into packets which are sent individually from the first computer device 31. The packets can be packed in frames, enabling them to be synchronized for streaming. This both enables bandwidth control and also enables the streaming of the mix instructions files while the instructions and/or files are being created. If the device 32 has a screen 36, the playback program 38 or a separate program can provide control functions for displaying information related to the mix, for example which track is being played, which track is going to be played soon, any effects that have been applied, etc.

In one embodiment the second device 32 is arranged to display an image on the screen emulating a DJ device and having control input means for performing various functions and optionally applying additional effects to the music playback. In this case, the mix instructions file includes not only information needed for loading the right tracks and manipulating them as desired, but also information about how the creator of the mix instructions file used the various input means on his device to select tracks and manipulate them. To achieve this, the playback program 38 also includes functions for manipulating the control input means on the screen to reflect the functional effects being performed on the music tracks in response to the instructions in the mix instructions file. The screen will then function as a kind of "player piano" reflecting the music being played.

FIG. 2 shows a mix instructions file 1 divided into exemplary first 2, second 4 and third 6 mix instructions packets, each packet comprising all mix instructions for a part of the file corresponding to a certain period of time when playing back the music mix. The exact period of time covered by a mix instructions packet may be the same for all packets, but preferably the period of time is variable among the packets. When processing the mix instructions, the packets 2, 4, 6 can be retrieved one at a time. At the start 8 of the first packet 2 of the mix instructions file 1, a first music track file 21 is identified or addressed, as indicated by the arrow 9; and the packet 2 then contains instructions for how to manipulate the playback of the music track file—i.e., effect(s) to be applied to the music track. This effect may include speed changing manipulation, such as bend or pitch; changing of playback volume; and/or addition of a loop or a playback effect, such as reverb or scratch. The manipulation actions indicated in the mix instructions file represent a playback state indicating which music track file (or files) is currently being played, the position in the music track file, and the effects that are currently being applied, for example playback speed.

The first mix instructions packet 2 of FIG. 2 also includes a command to retrieve a second music track file 23—to be mixed with the first music track 21 file after a period of time, and a command to crossfade from the first music track file 21 to the second music track file 23. The command to retrieve the second music file 23 is shown by the arrow 10. The time period for crossfade is indicated as a shaded area 24 in FIG. 2.

In the second packet 4, a command to retrieve a third music track file 25 is indicated by an arrow 11. The crossfade from the second track to the third track is shown as a shaded area 26 in FIG. 2. In FIG. 2, the third packet 6 is not arranged to retrieve any music track file but only to continue manipulating the music track file or files already used by the second packet 4. Of course, each of the mix instructions packets 2, 4, 6 could be arranged to retrieve an arbitrary number of music track files and apply any combination of effects to the files as desired.

Preferably, each mix instructions packet, or each mix instructions packet after the first packet 2, starts with a start portion 12, 14 shown as a shaded area at the start of the respective packet. The start portion 12, 14 can include a complete representation of the playback state of the music mix at the start time of the packet, which is the same as the state at the end of the previous packet. The first mix instructions packet may have such a start portion but it is not needed since there will be no previous activity to take into account. Throughout the packet, the changes made to the music mix, that is, a change of music tracks or any effects applied, can then be stored incrementally in the packet. Alternately, the mix instructions file may also be designed such that one or more mix instructions packet has complete information of the state of the music mix at an arbitrary point in time within the music mix. This enables the start of the music playback at any such arbitrary point in time, with the desired effects being applied.

When playing back, or processing, the mix instructions file 1 from the start, this first music track file 21 is retrieved and then manipulated in the ways indicated in the mix instructions file. At the appropriate point in time the second music track file is retrieved and manipulated in the ways indicated in the mix instructions file. The playback speed of the first and/or second music track file can be changed so that they match, and a cross fade from the first to the second music track file is performed.

The function of the mix generating program 37 will be discussed as follows. When the creator of a mix starts creating a music mix in the mix generating program 37 on the first device 31, this process involves retrieving music tracks and adding effects such as bend, pitch, scratch etc. at the desired points in time. The exact effects that are available will depend on desired music playback effect and impact, the mix generating program, and the playback program 38. Also, in some implementations, it is possible to import effects from external modules. If the music mix is to be played in a different playback program 38, the same effects should be available in the playback program 38 as in the mix generating program 37, to ensure that the playback sounds the same on all devices. Similarly, if the music mix is to be played by various different playback programs 38, the same effects should be available in each of the playback programs 38, again to ensure consistent playback sounds and effects.

In one embodiment, the user of the mix generating program 37 can broadly apply parameters to the program 37, providing information where to locate the desired music track files to be played, the effects to be applied to manipulate the playback of the music, and how to apply the effects to various portions of the music. Once the parameters are defined, the user can instruct the mix generating program 37 to proceed; and the program 37, can dynamically and without further user input, create the mix instructions file. The mix generating program 37 can also, if instructed beforehand, transmit the mix instructions file to the targeted second computer device(s) 32.

The mix generating program 37 also performs the functions needed to enable transmitting the file to the second device 32, and for storing it at the first device 32. This involves dividing the mix instructions file into packets. There are two reasons for dividing the mix instructions file into packets: Firstly, the size of the packets can be adapted to bandwidth requirements. Also, for playback at the second device 32 in near real-time the mix instructions file must be transmitted while it is being created. This means that parts of the file already generated should be transmitted before the whole mix is completed.

To ensure that the music tracks identified in each new packet can be played as desired, each packet should comprise information covering the entire playback state of the mix at the point in time corresponding to the start of the packet. Alternatively, only some of the packets may be arranged to comprise such information, especially for those packets that continue the same effect(s) as indicated for the previous packet(s). This latter option will reduce the amount of overhead that needs to be transmitted for the music mix, but may also reduce the quality of the playback. Also, it may not always be possible to jump just to the start of the current packet; it may be necessary to jump back to the nearest preceding packet that has the whole state.

The information at the start of a packet typically includes information such as which tracks are active, the position within each track, the playback speed and other effects that may have been applied, and also tracks that are being retrieved or should be retrieved soon. Preferably the packet should also comprise the data stored in the buffer of a particular effect at this point in time, to ensure that the playback will sound correct. This is particularly useful when the mix is not played consecutively from start to finish. For example, when jumping back to a point in time in which reverb is applied, the actual playback resulting from the reverb effect in a given moment will depend on the reverb applied up to that moment.

This means that each packet preferably carries some overhead in the form of state information. The packets therefore should not be too small, as this will lead to increased total amount of overhead information transmitted through the network. At the same time, the packet should be small enough to facilitate transmission with low latency. For transmission in near real time, a packet may cover a second or less of music track playback. When transmitting a mix instructions file for later use, the play time period included in each packet can be selected more freely, for example up to 10 seconds.

The packets may be selected to cover a fixed amount of time, which may be the same for all packets; or more preferably, the packets may be divided independent of the amount of information in each packet. If no effects are added in a particular period of time, the packet corresponding to that period of time will contain very little data per time unit. Therefore the packet can be selected to cover a longer period of time without becoming too large. At a time when several effects are being applied, and/or several tracks are retrieved, within a short time period, there will be a lot of information for a certain period of time. In this case, the packet should cover a shorter period of time to keep the packet at a manageable size. Also it is preferable to divide between packets at points where relatively little status information needs to be transmitted. This may be, for example, when there are no special effects, since special effects that are added to the music will increase the amount of overhead data that needs to be transmitted. Also, it may be when only one track is playing, and no track is being retrieved. This will be discussed in connection with FIG. 3

The music tracks that are to be used for playback when processing the mix instructions file may be stored locally in the device 32 on which the mix instructions file is processed or may be retrieved from another device or from a network. Therefore, there may be a delay in retrieving the tracks, so that they may not be available when they are to start playing. This is a problem in particular when the second device 32 needs longer to retrieve the tracks than the first device 31 on which the mix was created. A special case is when the music files themselves are found on the first device 31. When creating the mix instructions file, therefore, the mix generating program 37 is arranged to include an instruction to start playing a particular music track file at a particular point in time and to add an instruction for an earlier point in time to start retrieving this music track. In order to ensure that the next music track file is available at the right point in time, the mix instructions file therefore can include an advance indication (or pointer to the next music track file) that the next music track file is to be used, and therefore timely retrieved.

In FIG. 2, two such advance indications are shown, represented by triangles 16 and 18, indicating that the second 23 and third 25 music track file, respectively, should be retrieved. In this way, the device can start retrieving the second music track file, for example, a couple of seconds before it is to be played and buffer it so that it will be available when it is needed and there is no delay in the timely playback of the music tracks. The difference in time between the particular point in time 10 and the earlier point in time 16 should be selected to ensure that enough of the music track 23 has been received in the device 32 before the instruction to start playing the music track file is to be executed by the playback program 38. The mix instructions packets are preferably arranged in such a way that the advance indication and the command to retrieve the second music file are in the same packet. If they are placed in different packets, the amount of data needed to keep track of the retrieval of the music file when moving from one packet to another in the mix increases, thereby adding to retrieval overhead.

In one embodiment a mix instructions packet can also comprise state checkpoints at other points than at the beginning of the packet. A state checkpoint would comprise all or a part of the playback state of the music mix at the relevant point in time and would facilitate timely recovery during playback for a music track retrieval failure and permit jumping back to a previously-played track.

FIG. 3 illustrates schematically a playback situation in which a music mix is being played back using two channels: a first channel Ch1 and a second channel Ch2. The first channel Ch1 is shown in the uppermost half and the second channel Ch2 is shown in the lowermost half. The tracks being played are shown as elongate rectangles along a time line.

The situation in the drawing starts with a first track 101 being played in the first channel Ch1. At a first point in time t1 a first effect is applied to the first track, and at a second point in time t2 the effect ends. At a third point t3 in time a second track 102 starts to play in the second channel Ch2, and at a fourth point in time t4 the playback of the first track stops. Between the third and fourth points in time t3, t4, normally a crossfade is applied to fade out the first track 101 while increasing the volume of the second track 102. Between a fifth t5 and a sixth t6 point in time a second effect is applied to the second track.

Ideally, a playback can start at any point in time of the music mix. As discussed in connection with FIG. 2, the mix instructions file is preferably divided into packets in such a way that each new packet starts at a point in time when no effect is being applied and when there is no loading of new tracks. So preferable times to begin a packet in the example in FIG. 3 would be, for example, between the second t2 and third t3 points in time and between the fourth t4 and fifth t5 points in time, indicated by a dash-dotted line 105, when only the identification of the track being played, that is, the first 101 and second 102 track, respectively, and the position within the track, need to be communicated. Similarly, if the playback is to start at such times, the appropriate needed information can be communicated.

To know which track is being played, and which effects are being applied, at any given time, a state mask may be utilized, which keeps this state information for each point in time. The state mask information for the mix may be in the form of a table pointing to all points in time when the state was changed. This includes points in time when a new track is loaded, when it starts playing when a track stops playing, and any effects applied to a track.

The state mask information may be built into a simple table having one record for each point in time, each record comprising a number of bits corresponding to different effects, and set to indicate if the effect is active or not. Typically, if the effect is applied at the relevant point in time the bit is set to 1, and if not, the bit is set to 0. It is possible to include a reference in the table to the point in time when an effect that is being applied was started. This would increase the size of each mask record. To limit the size increase, this feature could be implemented only for effects that vary over time, or for which knowing the start of particular effects would be advantageous. A pointer to the track being played may be included in the same table, or may have a table of its own, indicating for each point in time which track is being played. The actual position within the track for the start of an effect should be included in one of the tables. Alternatively, the state mask information may be built and retained as first state mask information for the music track file locations and as second state mask information for the effects information for the corresponding music track file locations, all stored in a state mask table. Further, the first state mask information can be stored in a first state mask table, and the second state mask information can be stored in a second state mask table. While it is envisioned that the state mask and any state mask tables and files are constructed as the mix instructions file is being created on the first computer device 31 and are transmitted to the second computer device 32, it is also possible that the state mask information and/or state mask tables can be built as the playback proceeds on the second computer device 32.

The effects may be any type of effect known in the art. Some effects will affect the music track in a well-defined way, which will be the same for as long as the effect is applied. For others, the result will vary over time. For example, echo or reverb effects can vary over the time period when they are applied to the track. To handle this latter type of effect, for example to start playback at a particular point in time when such an effect is being applied, it will not be enough to retrieve the state mask for this particular point in time. To obtain the exact desired playback result, it is necessary to go back to the point in time when the effect was first applied, for example, t1 or t5 in FIG. 3 and play back, or analyze the playback, from this point in time. It may not always be feasible to jump to exactly the point in time t1 or t5 where the effect starts. Instead, it may be preferable to jump to an earlier point in time, for example the beginning of the packet in which the effect is applied. In this case, assuming that the start of a packet is indicated by the dashed line 105 in FIG. 3, this means that if a start between the fifth and sixth points in time t5, t6 is attempted, the start will actually be at the point of time 105 where the packet starts. This is a suitable position for the start of a packet since the mix instruction includes no commands at this point, so the only thing that is happening is that the second track is being played.

An alternative embodiment is shown in FIG. 4, which like FIG. 3 shows a mix using a first channel Ch1 and a second channel Ch2. The example is similar to that of FIG. 3, starting with a first track 201 being played in the first channel Ch1. After a period of time a second track 202 starts to play in the second channel Ch2, and some time later the playback of the first track 201 stops. At later points in time a third track 203 and a fourth track 204 start, respectively. Effects being applied to the tracks are shown as shaded areas within the respective track.

In this embodiment, each packet within the mix instructions file has information about the track or tracks to be played and any effects to be applied to the track or tracks at any given time within the packet. A playback may be started at any point in time within the mix instructions file, but for illustrative purposes a first point in time 205 is identified in which a track is being played on the second channel Ch2 and a second point in time 206 is identified in which a track is being played on the first channel Ch1. At the first point in time 205 an effect is being applied to the second track. At the second point in time 206 no effect is being applied. Hence, when a playback is started at a particular position in the mix instructions file, information will be available in the file about current track(s) and effects to be applied to that track(s) but not about the effects starting point. As can be seen from FIG. 4, this lack of information can arise, for example, when the point in time occurs in the middle of an effect being applied.

To provide this effect start information, a table 210 can be provided for every packet, comprising information of the point in time for each change, that is, the starting point for each new track and for each effect. This is represented in FIG. 4 by solid arrows pointing from the table 210 to starting points for tracks and effects. For clarity reasons not all possible pointers are shown in FIG. 4. The table 210 is generated by the mix generating program 37 after a packet has been built within the mix instructions file. If the mix instructions file is not to be shared in realtime or semi-realtime, all tables may be generated after the mix instructions file is finished, or one table may be used for several packets, or for the whole mix instructions file. To generate the table 210, the packet is searched and any starting points are noted. Optionally, the table 210 can be built at the completion of the mix instructions file by searching each packet in the file.

In all embodiments, a hierarchy of the types of information may be defined. Of course, the most important information to keep track of at any given time is the identification of the music track file to be played and its starting point. Information concerning the application of effects such as echo or scratch, which vary over time, is also important, since the result of this effect will vary over time. Also, such effects may affect the timing of the playback of the track. Information concerning the application of effects that do not vary over time is less important to keep exact track of. This means that in the embodiment shown in FIG. 4, information about the starting point of each track can be found in the table. Preferably, information about the starting point of any effect that will vary dependent upon time, such as scratch or echo, is included. Of course, it is possible to include other information as well, such as information about effects that are constant over time. In general, however, it is desired to minimize the amount of information, to keep the amount of information that must be transmitted as low as possible.

In the embodiment in FIG. 4, if the table 210 is not provided, it will still be possible to start playing back the mix at any point in time. In this case, however, at least information about the starting point of the track or tracks must be determined in some alternative way, to determine the correct time in the track to be played. One alternative way would be to search through the packet backwards in time so that the starting points of current track or tracks can be determined. In accordance with the reasoning above at least the starting points of tracks need to be determined. Preferably, when a new track starts, all effects applied to the previous track are stopped. Alternatively, it may be possible to keep effects running also when the track being played is changed.

The mix instructions file according to the preferred embodiments invention is suitable for being streamed, and for use with streamed music track files, since it is designed to minimize latency, as outlined above. It is therefore suitable for use with music streaming services such as Spotify® and WiMP®. Any combination of streaming and stored files may be used according to the embodiments. This means that both the mix instructions file and the music track files may be streamed, or the mix instructions file may be stored while the music track files are streamed, or the other way around. Also, some music track files may be stored locally and others streamed. For example, a function may be provided that determines which music tracks are available locally and arranges to have any other music track files streamed from a music streaming service.

In some configurations and uses, when adding a track to a mix, the track should start playing at some other point than the beginning of the track. For example, in some streaming services, such as Spotify®, all tracks are subdivided in such a way that it is possible to jump to a point within a track. In other formats, such as mp3, there is no such division, so it would be useful to provide a way of knowing exactly to which point in the file to jump. For such files it is necessary to analyze the file, at least up to the point where the playback should start. This is done by reading the entire file up to the point where the playback should start and inserting subdivisions. The program is thus configured to subdivide the file into packets of data and make a table of which samples are contained in which packet. In this way the position of a particular sample within an mp3 file can be identified.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes and methods described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A non-transitory computer readable medium comprising a mix instructions data structure for controlling the playback of at least first and second music track files in a music mix, the mix instruction data structure including a mix instructions file comprising:
    a first packet configured to control the playback of at least the first music track file during a first period of time, wherein the first packet comprises an indication of at least one effect for manipulating the playback of the first music track file; and
    a second packet configured to control the playback of at least the first and second music track files during a second period of time, wherein the second period of time begins when the first period of time ends, and the second packet comprises (i) an indication of the second music track file at a point in the second period of time when the second music track file is to be played, and (ii) information defining a state of the music mix at the start of the second period of time, which is the same as a state of the music mix at the end of the first period of time;
    wherein the information defining the state of the music mix at the start of the second period of time includes an indication of the first music track file, a playback position within the first music track file, and an indication of the at least one effect for manipulating the playback of the first music track file;
    wherein each of the first and second packets is capable of being transmitted independently of each other; and
    wherein the second packet is arranged to be transmitted after transmission of the first packet.

2. The non-transitory computer readable medium according to claim 1, wherein the second packet further comprises an advance pointer to the second music track file at a point in time before the point in the second period of time when the second music track file is to be played, and the advance pointer enables timely retrieval of the second music track file.

3. The non-transitory computer readable medium according to claim 1, wherein the second packet has the information defining the state of the music mix at the start of the second period of time at the beginning of the second packet.

4. The non-transitory computer readable medium according to claim 1, wherein each of the first and second packets of the mix instructions file comprises, for at least first and second points in time, information identifying a music track file being played at the first and second points in time, respectively.

5. The non-transitory computer readable medium according to claim 4, further comprising a table related to at least one of the first and second packets, said table comprising information identifying at least one point in time where a music track file starts.

6. The non-transitory computer readable medium according to claim 1, comprising, for at least first and second points in time within at least one of the first and second packets, information related to the application of effects to a music track file at the first and second point in time, respectively.

7. The non-transitory computer readable medium according to claim 1, wherein each of the first and second packets of the mix instructions file has complete information of the state of the music mix at an arbitrary point in time within the music mix.

8. The non-transitory computer readable medium according to claim 1, wherein the first and second packets are configured and transmitted to provide for near real-time playback of the music track files as the mix instructions file is being created and transmitted.

9. A non-transitory computer readable medium encoded with computer executable instructions which, when run on a first computer device, will cause the first computer device to:
   (a) retrieve first location information identifying the location of a first music track file to be included in a music mix at a first point in time and add the first location information to a mix instructions file;
   (b) select at least one effect to control the playback of the first music track file and add an effect indicator to the mix instructions file as related to the first location information;
   (c) retrieve second location information identifying the location of a second music track file to be included in the music mix at a second point in time and add the second location information to the mix instructions file;
   (d) divide the mix instructions file into at least first and second packets, wherein:
      the first packet is configured to control playback of at least the first music track file during a first period of time,
      the first packet comprises (i) the first location information and (ii) the effect indicator related to the first location information,
      the second packet is configured to control playback of at least the first and second music track files during a second period of time that includes second point in time,
      the second period of time begins when the first period of time ends,
      the second packet comprises (i) the second location information and (ii) information defining a state of the music mix at the start of the second period of time, which is the same as a state of the music mix at the end of the first period of time, and
      the information defining the state of the music mix at the start of the second period of time includes the second location information, a playback position within the first music track file, and an indication of the at least one effect for manipulating the playback of the first music track file; and
   (e) transmit the first packet of the mix instructions file followed by the second packet of the mix instructions file to a second computer to be processed by a playback program, causing the second computer device, with or without user input, to play the music mix in accordance with the information and indicators in the mix instructions file.

10. The non-transitory computer readable medium according to claim 9, comprising instructions, which, when run on the first computer device, will further cause the device to identify the second point in time at which the second music track file is to be played and to insert in the mix instructions file an advance pointer to the second music track file at a point in time before the second point in time, to enable timely retrieval of the second music track file.

11. The non-transitory computer readable medium according to claim 9, comprising instructions, which, when run on the first computer device, will cause the device to include in the mix instruction file, for at least two points in time, information identifying a music track file to be played at the two points in time, respectively.

12. The non-transitory computer readable medium according to claim 9, comprising instructions, which, when run on the first computer device, will cause the device to include in the mix instruction file, for at least two points in time, information related to the application of effects to a music track file at the two points in time, respectively.

13. The non-transitory computer readable medium according to claim 9, comprising instructions, which, when run on the first computer device, will cause the first packet and the second packet to be configured and transmitted to provide for near real-time playback of the music track files as the mix instructions file is being created, transmitted, and processed.

14. The non-transitory computer readable medium according to claim 9, comprising instructions, which, when run on the first computer device, will cause the steps to be performed dynamically, without user input.

15. The non-transitory computer readable medium according to claim 9, comprising instructions, which, when run on the first computer device, will cause the device to build a state mask table comprising, for each music track location, first state mask information for the music track location and second state mask information for the effect indicator.

16. A computer-implemented method for playback of at least first and second music track files in a music mix, the method comprising:
   (a) reading, on a second computer, a first packet of a mix instructions file that has been created on a first computer and transmitted over a network by the first computer, wherein:
      the first packet is configured to control the playback of at least the first music track file during a first period of time, and
      the first instruction comprises an indication of at least one effect for manipulating the playback of the first music track file;
   (b) reading, on the second computer, a second packet of the mix instructions file that has been transmitted over the network by the first computer after transmitting the first packet over the network, wherein:
      the second packet comprises a second instruction for controlling the playback of at least the first and second music track files during a second period of time,
      the second period of time begins when the first period of time ends,
      the second instruction comprises (i) an indication of the second music track file at a point in the second period of time when the second music track file is to be played and (ii) information defining a state of the music mix at the start of the second period of time, which is the same as a state of the music mix at the end of the first period of time, and the information defining the state of the music mix at the start of the second period of time includes an indication of the first music track file, a playback position within the first music track file, and an indication of the at least one effect for manipulating the playback of the first music track file;

(c) retrieving the first music track file based on information in the mix instructions file;

(d) initiating playback of the first music track file at a point in time based on information in the mix instructions file;

(e) applying an effect to the first music track file to control playback of the first music track file based on the indication of the at least one effect for manipulating the playback of the first music track file in the first packet of the mix instructions file;

(f) retrieving the second music track file based on the indication of the second music track file in the second packet of the mix instructions file;

(g) initiating playback of the second music track file at the point in the second period of time based on information in the second packet of the mix instructions file.

17. The method according to claim 16, further comprising:

displaying, on a screen on the second computer device, information related to the playing of a music track file.

18. The method according to claim 16, further comprising:

playing back a plurality of music tracks in near real-time as the mix instructions file is being created and transmitted to the second computer.

19. The method according to claim 16, wherein retrieving the second music track is initiated before the point in the second period of time based on an advance pointer in the second packet of the mix instructions file.

20. The method according to claim 16, wherein each of the first and second packets has complete information of a state of the music mix at an arbitrary point in time within the music mix.

21. The method according to claim 17, wherein the information related to the playing of the music track file comprises one or more of the title of the music track file being played and the effects applied to the music track file.

22. The mix instructions file according to claim 5, wherein the information of the table also identifies at least one point in time where an effect starts.

23. The non-transitory computer readable medium according to claim 1, wherein the mix instructions data structure is for controlling the playback of at least the first and second music track files and a third music track file in the music mix, and the mix instructions file further comprises:

a third packet configured to control the playback of at least the second music track file during the second period of time, wherein the third packet comprises an indication of at least one effect for manipulating the playback of the second music track file; and a fourth packet configured to control the playback of at least the second and third music track files during a fourth period of time, wherein the fourth period of time begins when the third period of time ends, and the fourth packet comprises (i) an indication of the third music track file at a point in the fourth period of time when the third music track file is to be played, and (ii) information defining a state of the music mix at the start of the fourth period of time, which is the same as a state of the music mix at the end of the third period of time;

wherein the information defining the state of the music mix at the start of the fourth period of time includes an indication of the second music track file, a playback position within the second music track file, and an indication of the at least one effect for manipulating the playback of the second music track file;

wherein each of the first, second, third, and fourth packets is capable of being transmitted independently of each other; and wherein the fourth packet is arranged to be transmitted after transmission of the third packet.

* * * * *